United States Patent
Inomata et al.

(10) Patent No.: US 6,376,121 B1
(45) Date of Patent: Apr. 23, 2002

(54) SPIRALLY-WOUND LITHIUM SECONDARY CELL HAVING A PLURALITY OF CURRENT COLLECTOR TABS AND METHOD OF MANUFACTURE

(75) Inventors: Hideyuki Inomata; Naoya Nakanishi; Mitsuzo Nogami; Ikuo Yonezu; Koji Nishio, all of Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/485,172

(22) PCT Filed: Sep. 28, 1998

(86) PCT No.: PCT/JP98/04327

§ 371 Date: Feb. 7, 2000

§ 102(e) Date: Feb. 7, 2000

(87) PCT Pub. No.: WO99/17391

PCT Pub. Date: Apr. 8, 1999

(30) Foreign Application Priority Data

Sep. 30, 1997 (JP) ............................................. 9-266171

(51) Int. Cl.[7] ................................................. H01M 6/10
(52) U.S. Cl. .................... 429/94; 429/211; 429/231.95; 29/623.1
(58) Field of Search ...................... 429/94, 211, 231.95; 29/623.1, 623.2, 623.3, 623.4, 623.5

(56) References Cited

U.S. PATENT DOCUMENTS

| | | | |
|---|---|---|---|
| 5,185,224 A | 2/1993 | Barnabei et al. ............ | 429/218 |
| 5,736,270 A | * 4/1998 | Suzuki et al. | |
| 5,849,431 A | 12/1998 | Kita et al. ................... | 429/164 |
| 6,235,426 B1 | * 5/2001 | Yanai et al. | |

FOREIGN PATENT DOCUMENTS

| | | | |
|---|---|---|---|
| EP | 0771040 A2 | | 5/1997 |
| JP | 06267528 | | 9/1994 |
| JP | 06-267528 A | * | 9/1994 |
| JP | 09161840 A | | 6/1997 |
| JP | 10162861 A | | 6/1998 |

* cited by examiner

Primary Examiner—Gabrielle Brouillette
Assistant Examiner—Susy Tsang
(74) Attorney, Agent, or Firm—Armstrong, Westerman & Hattori, LLP (57) ABSTRACT

A lithium secondary cell is disclosed in which a positive electrode plate and a negative electrode plate are spirally wound with a sheet of separator interposed therebetween. A plurality of positive electrode current collector tabs are attached to the positive electrode plate so that an interval is formed between the positive electrode current collector tabs in a longitudinal direction of the positive electrode plate, and a plurality of negative electrode current collector tabs are attached to the negative electrode plate so that an interval is formed between the plurality of the negative electrode current collector tabs in a longitudinal direction of the negative electrode plate. In a state of the positive electrode plate and negative electrode plate being wound together, the positive electrode current collector tabs and the negative electrode current collector tabs are so disposed as to face each other with the separator interposed therebetween.

9 Claims, 8 Drawing Sheets

SPIRALLY-WOUND LITHIUM SECONDARY CELL HAVING A PLURALITY OF CURRENT COLLECTOR TABS AND METHOD OF MANUFACTURE

TECHNICAL FIELD

The present invention relates to a lithium secondary cell and a method of manufacturing thereof, and more particularly to a lithium secondary cell in which a high power density is required and a method of manufacturing thereof.

BACKGROUND OF THE INVENTION

In recent years, cylindrical lithium ion secondary cells have been expected as a secondary cell that can achieve a large capacity and a high power density.

In such lithium secondary cells, the following drawbacks have been noted, particularly when such cells are required to have a large capacity and a high power density.

(1) The length of a sheet type electrode plate inevitably becomes large, and therefore, if the number of tabs is small, an effect of current collection declines. As a result, an internal resistance of the cell becomes large, and the cell performance is consequently deteriorated.

(2) In order to avoid unevenness of the potential distribution on the electrodes, it is required that the current collector tabs be evenly arranged in the longitudinal direction of the current collector. As a consequence, in order to avoid unevenness of reaction, it is required that each of the positive electrode active material and the negative electrode active material be present in a well-balanced manner on each opposite surface in each of the electrodes, with a separator interposed between the electrodes. It is to be noted here that the term the "unevenness of reaction" is intended to mean that when a negative electrode active material does not exist in a position in a negative electrode plate corresponding to a positive electrode active material, metal lithium is deposited because of the inhibition of the intercalation of lithium ions in the corresponding position.

In order to provide a solution for the above drawbacks, several types of lithium secondary cells have been suggested. One typical example of such a prior art cell is shown in a Japanese Unexamined Patent Publication No. 6-267528, which discloses a lithium secondary cell having the following construction. The cell has a sheet type current collector for both the positive and the negative electrodes, and in both electrodes, one lengthwise side part (i.e., both the upper and bottom portions of the spirally wound electrode assembly) is protruded from a separator with no active material applied thereon, so as to form a positive and a negative electrode lead connecting parts. A plurality of positive electrode leads are then connected to the positive electrode connecting parts, and a plurality of negative electrode leads are likewise connected to the negative electrode connecting parts.

The above prior art cell, however, has such drawbacks that, since the current collector tabs are welded to only one end of the current collector, the potential variation in the width direction of the electrodes is rendered large, that a large output power is not possible, and that a cycle life of the cell becomes short.

DISCLOSURE OF THE INVENTION

In view of the above-described drawbacks in prior art, it is an object of the present invention to provide a lithium secondary cell in which imbalance between the capacities of the positive electrode and the negative electrode is minimized, potential variation is reduced, and a high output power is achieved. The characteristics of the present invention are detailed in the following.

According to the present invention, there is provided a lithium secondary cell comprising a spirally-wound electrode assembly in which a positive electrode plate and a negative electrode plate are spirally wound with a sheet type separator interposed therebetween, the positive electrode plate comprising a sheet type positive electrode current collector and a positive electrode active material formed on both surfaces of the positive electrode current collector, and the negative electrode plate comprising a sheet type negative electrode current collector and a negative electrode active material formed on both surfaces of the negative electrode current collector, the lithium secondary cell characterized in that:

a plurality of positive electrode current collector tabs are attached to the positive electrode plate so that an interval is formed between the plurality of the positive electrode current collector tabs in a longitudinal direction of the positive electrode plate;

a plurality of negative electrode current collector tabs are attached to the negative electrode plate so that an interval is formed between the plurality of the negative electrode current collector tabs in a longitudinal direction of the negative electrode plate; and in a state of the positive electrode plate and the negative electrode plate being wound, each of positive electrode current collector tabs and each of the negative electrode current collector tabs are so disposed as to face each other with the separator interposed therebetween.

According to the above construction, since the plurality of positive electrode current collector tabs and the plurality of the negative electrode current collector tabs are disposed so as to face each other with the separator interposed therebetween, the negative electrode active material is made to be present in a position corresponding to the positive electrode active material. As a result, deposition of metal lithium can be avoided, and a charge-discharge cycle life of the cell is improved. In addition, since the positive electrode current collector tabs and negative electrode current collector tabs are disposed so as to face each other in the longitudinal direction, unevenness of potential distribution caused in the longitudinal direction of the positive and the negative electrode plates can be thereby suppressed, and a cell with a high output power can be achieved.

Moreover, since the current collector tabs are provided in plurality in the longitudinal direction of the positive and the negative electrode plates, efficiency of current collection is thereby increased, and as a result, it is made possible to reduce an internal resistance of the cell and thereby improve the cell performance.

In addition, in the above construction of the lithium secondary cell, the following construction may be further employed. In the positive electrode plate, an applied area on which a positive electrode active material is applied and a non-applied area on which the positive electrode active material is not applied, are formed on the positive electrode plate alternately in the longitudinal direction of the positive electrode plate;

the positive electrode current collector tabs are firmly attached to the positive electrode current collector within non-applied area; and a ratio W (L4/L2) of a width L4 of the non-applied area to a width L2 of the negative electrode current collector tab is between 1.2 and 3.5.

According to the above construction, because the aforementioned positive electrode current collector tabs are firmly fixed to the positive electrode current collector, it is made possible to realize a state in which the negative electrode current collector tabs are opposed to the positive electrode current collector tabs within the non-applied area in the electrode assembly being wounded together, even if a little displacement of the positive and the negative electrode plates occurs when winding the plates together. Accordingly, such an undesirable result is avoided that the positive electrode active material applied area and the negative electrode tab are overlapped, and therefore deposition of metal lithium is prevented.

The reason for restricting the ratio W to be between 1.2 and 3.5 are as follows. Firstly, if the ratio W is less than 1.2, there is a possibility of the negative electrode current collector tabs being overlapped with the positive electrode active material. On the other hand, if the ratio W is more than 3.5, the utilization factor of the positive electrode active material is reduced and thereby a high output power cannot be obtained.

In addition to the above-described constructions, the interval between the positive electrode current collector tabs and the interval between the negative electrode current collector tabs may be rendered to be within the range of 20 cm to 80 cm.

In the case where an increased number of the current collector tabs is required depending on the output power of the cell, the number of tabs can be increased by narrowing the interval of the current collector tabs. In such a case, if the interval of the tabs are made to be less than 20 cm, the winding of the positive and the negative electrode plates is rendered difficult since the number of the tabs becomes too large. Therefore, the interval of the tabs should be made at least 20 cm. On the other hand, if the interval of the tabs exceeds 80 cm, unevenness of potential distribution is incurred since the number of the tabs is too small, and therefore, the interval of the tabs is preferred to be 80 cm or smaller.

In addition to the above constructions, a width of the positive electrode current collector tab and a width of the negative electrode current collector tab may be both within the range of 10 mm to 30 mm.

The reasons for restricting the widths of the tabs are as follows. If a width of the tabs is made to be less than 10 mm, an allowable current value is rendered small, and consequently the number of the tabs needs to be increased. However, if the number of the tabs are increased, winding the positive and negative electrode plates becomes difficult. On the other hand, if the width of the tabs exceeds 30 mm, winding the positive and negative electrode plates is also rendered difficult since the width of the tabs becomes too large.

Further, according to the present invention, there is provided a method of manufacturing a lithium secondary cell comprising the steps of:

producing a positive electrode plate by forming a positive electrode active material layer on both surfaces of a sheet type positive electrode current collector, and thereafter firmly attaching a plurality of positive electrode current collector tabs so that an interval is formed between the plurality of positive electrode current collector tabs in a longitudinal direction of the positive electrode plate;

producing a negative electrode plate by forming a negative electrode active material layer on both surfaces of a sheet type negative electrode current collector; and spirally winding the positive electrode plate, the negative electrode plate, and the separator by firmly attaching a plurality of negative electrode current collector tabs on the negative electrode plate so that each of the plurality of negative electrode current collector tabs is opposed to each of the plurality of positive electrode current collector tabs, with interposing a sheet type separator between the positive electrode plate and the negative electrode plate.

According to the above method, it is made possible to readily manufacture a lithium secondary cell having the constructions as described above.

THE BEST MODE FOR CARRYING OUT THE INVENTION

The best mode for carrying out the invention is detailed hereinafter. It is however to be understood that the present invention is not limited to the following description.

Now with reference to FIGS. 1 to 5, preferred embodiments of the invention are described below.

Figure 1:
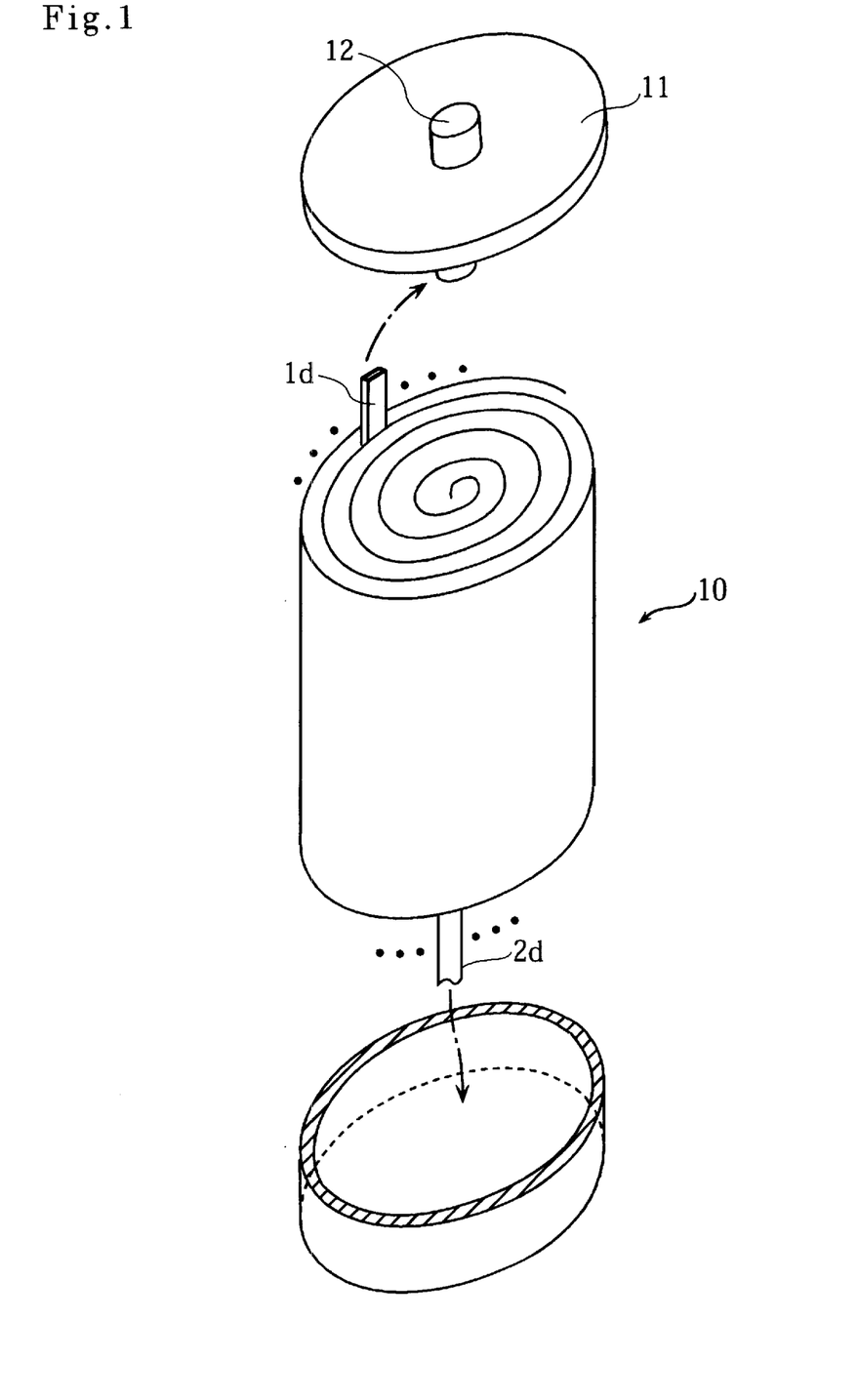
FIG. 1 is a perspective view showing a construction of a main portion of a lithium secondary cell according to the present invention.
Figure 2:
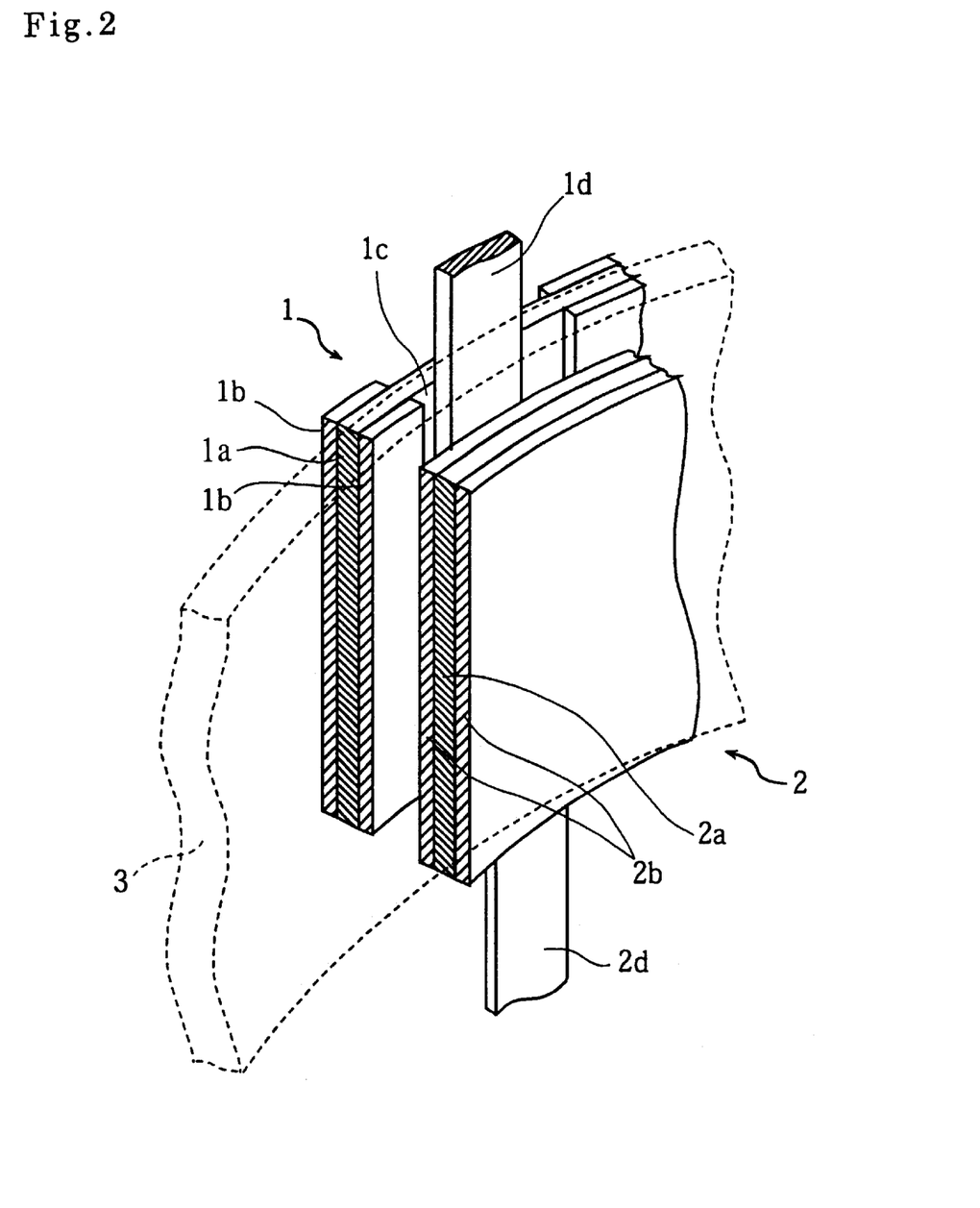
FIG. 2 is an enlarged partial view of a lithium secondary cell according to the present invention.

FIG. 1 shows a perspective view of the construction of the main portion of a lithium secondary cell according to the present invention. FIG. 2 shows an enlarged partial view thereof. A spirally wound electrode assembly 10 has a construction in which a sheet type positive electrode plate 1 and a sheet type negative electrode plate 2 are spirally wound together with a sheet type separator interposed therebetween. In the positive electrode plate 1, a plurality of positive electrode current collector tabs 1d are provided so that intervals between the tabs are formed in a direction of winding, and in the negative electrode plate 2, a plurality of negative electrode current collector tabs 2d are likewise provided so that intervals between the tabs are formed in the direction of winding. The positive electrode current collector tabs 1d and the negative electrode current collector tabs 2d are so disposed as to face each other, with the separator 3 (shown in FIG. 2 by dashed lines for the sake of clarity) interposed therebetween. An upper end part of each positive electrode current collector tab 1d is so formed to be upwardly projected from the upper end of the positive electrode plate 1, and a bottom end part of each negative electrode current collector tab 2d is so formed to be downwardly projected from the bottom end of the negative electrode plate 2. The upper end part of each positive electrode current collector tab 1d is electrically connected with a current terminal 12, which is attached to a cell lid 11, and the bottom end part of each negative electrode current collector tab 2d is electrically connected with a current terminal (not shown) attached to a cell bottom.

Figure 3:
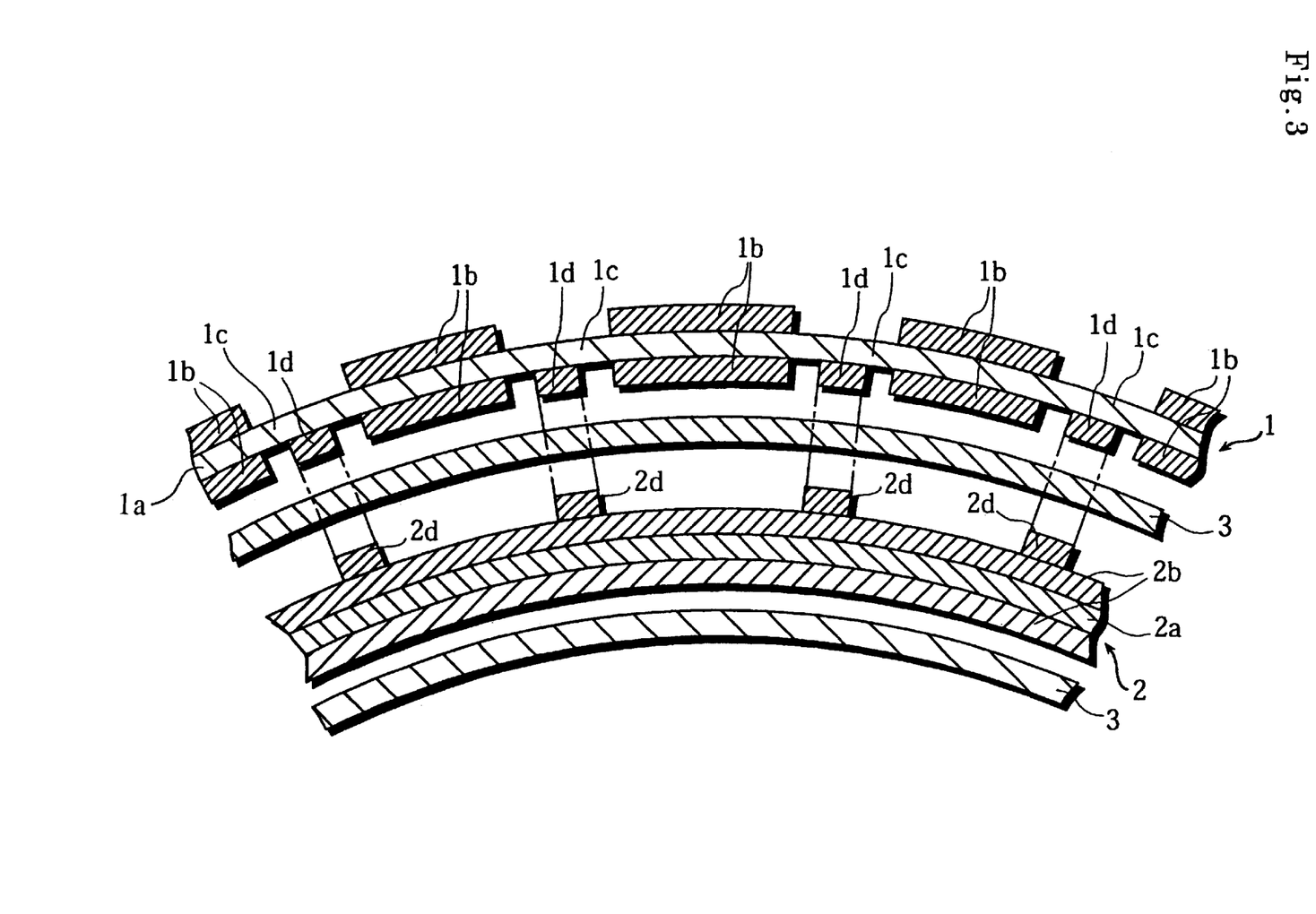
FIG. 3 is a plan view showing a disposed state of a positive and a negative electrode plates and a separator after they are wound together.

FIG. 3 shows an arrangement of the positive and negative electrode plates and the separator when they are wound together. (For the sake of clarity and convenience in the drawing, the positive electrode plate 1, the negative electrode plate 2, and the separator 3 are detached in FIG. 3, as if gaps are present between them.) With reference to FIG. 3 as well as FIGS. 1 and 2, the construction of a spirally wound electrode assembly 10 is now detailed. On both surfaces of the above-mentioned positive electrode plate 1, there are alternately formed an active material applied area 1b on which a positive electrode active material is applied, and an active material non-applied area 1c on which the positive electrode active material is not applied, so that the applied area 1b and the non-applied area 1c are alternately present in a longitudinal direction of the positive electrode plate 1. Each of the above-mentioned positive electrode current collector tabs 1d is firmly attached to a positive electrode current collector 1a in each of the non-applied areas 1c. On both surfaces of the above-mentioned negative electrode plate 2, an active material applied area 2b on which a negative electrode active material is applied, is formed on the entire surfaces, and a negative electrode current collector tab 2d is firmly attached in each of the positions in the active material applied area 2b corresponding to the aforementioned positive electrode current collector tabs 1d. Thus, in a state of the spirally wound electrode assembly being wound, the positive electrode current tabs 1d and the negative electrode current collector tabs 2d are so disposed as to face each other.

Consequently, such an undesirable result is avoided that a positive electrode active material applied area 1b and a negative electrode current collector tab 2d are faced and overlapped each other. Therefore, the present invention can provide a solution to such a problem in prior art that metal lithium is deposited because a position for a lithium ion to fit in (i.e., the negative electrode active material) is present in the negative electrode.

Figure 4:
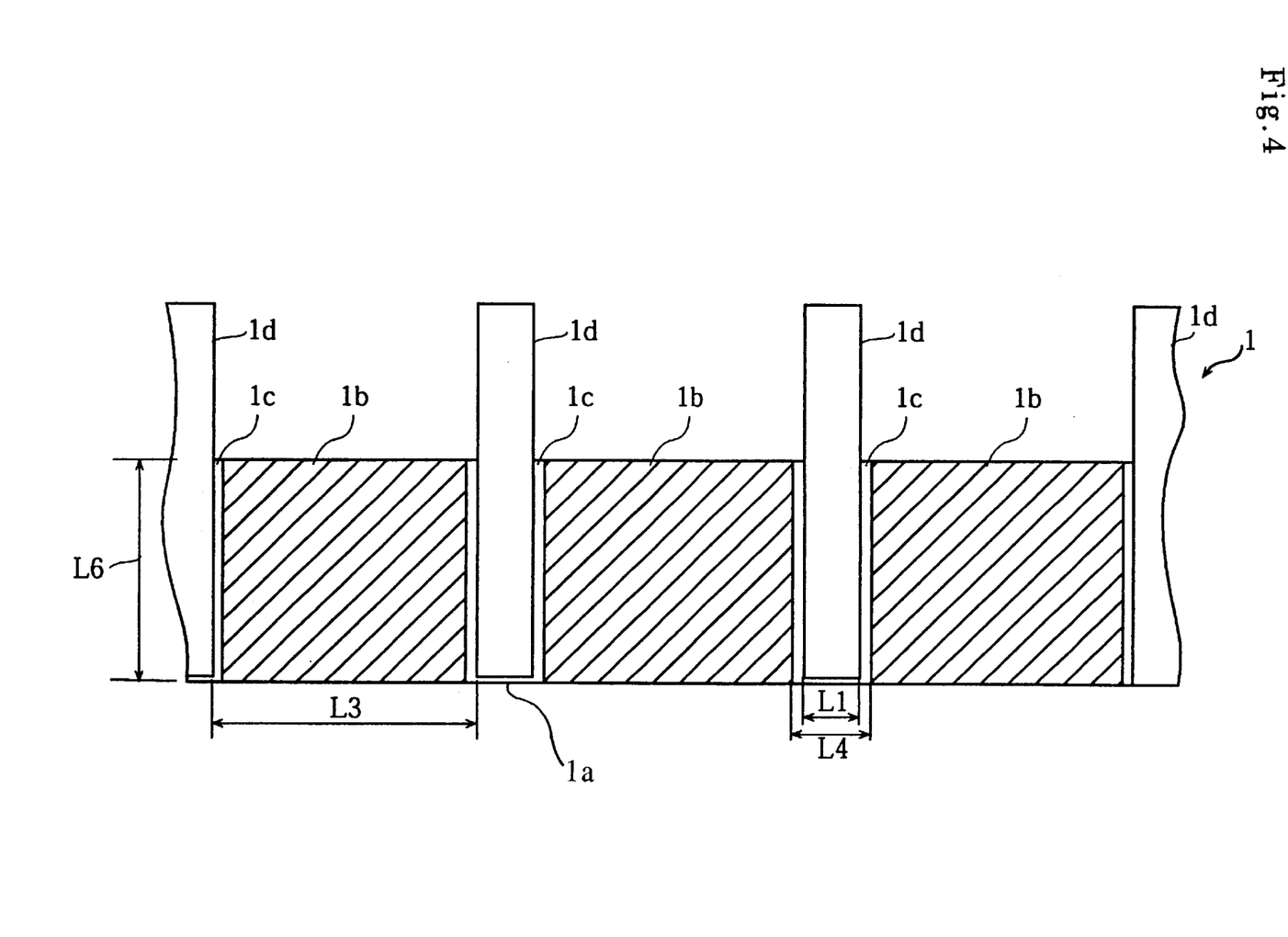
FIG. 4 is a front view showing the positive electrode plate.
Figure 5:
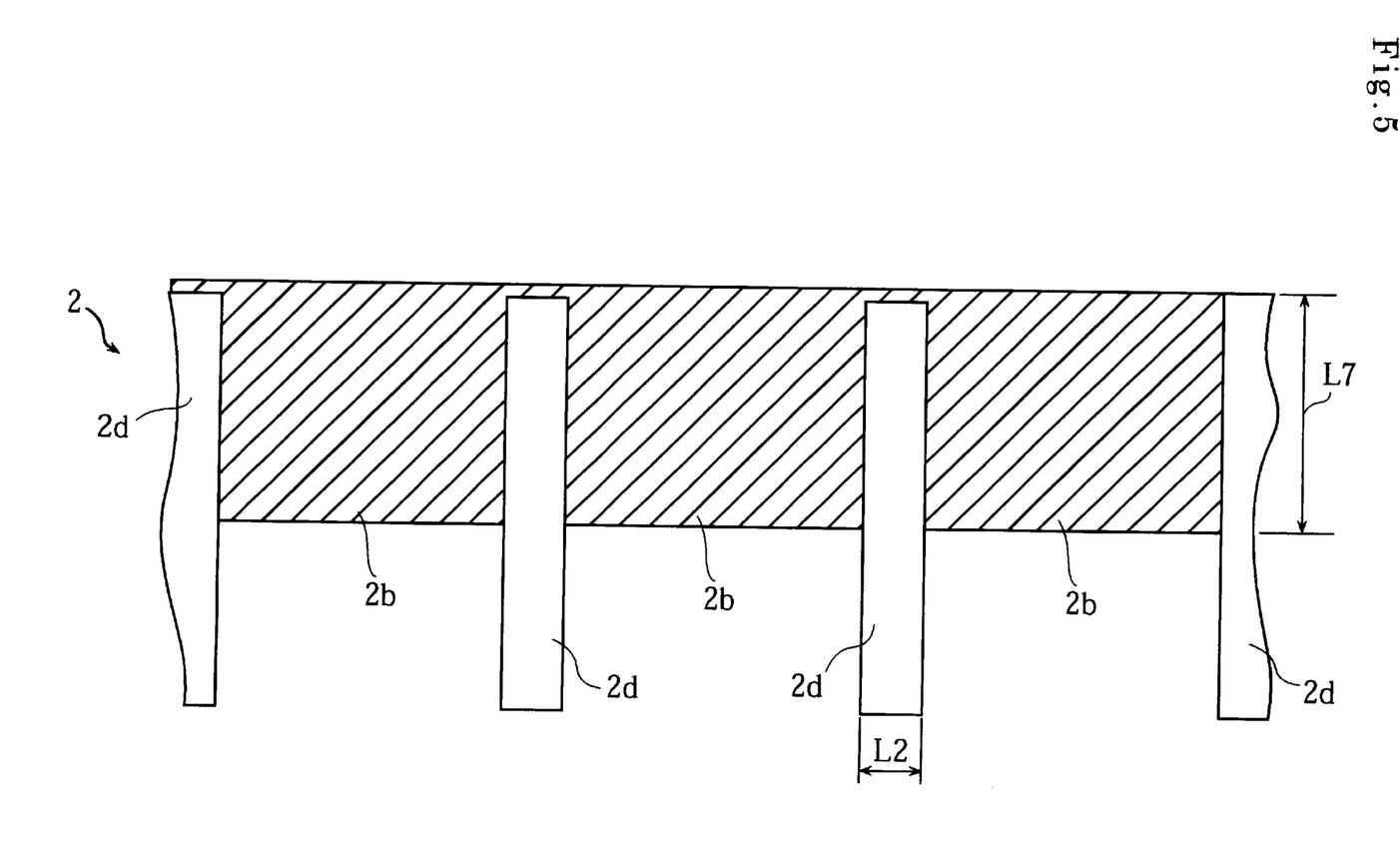
FIG. 5 is a front view showing the negative electrode plate.

FIG. 4 shows the positive electrode plate, and FIG. 5 shows the negative electrode plate. All the positive electrode current collector tabs 1d are made to have an, identical width L1, and likewise all the negative electrode current collector tabs 2d are made to have an identical width L2. The widths of the positive electrode current collector tabs 1d and the negative electrode current collector tabs 2d are made to be approximately identical to each other. In addition, both the widths L1 and L2 of the current collector tabs are restricted within the range of 10 mm to 30 mm.

In addition, an interval L3 of the current collector tabs is restricted within the range of 20 cm to 80 cm.

Under the above-described conditions of the widths and the interval of the current collector tabs, by increasing the number of the current collector tabs depending on a required power of the cell, it is made possible to provide a cell capable of achieving an uniform potential distribution and a high power.

Furthermore, a width L4 of the non-applied area 1c is set to be larger than the width L2 of the negative electrode current collector tab, and a ratio W of the width L4 of the non-applied area 1c to the width L2 of the negative electrode current collector tabs (W=L4/L2) is set to be within the range of 1.2 to 3.5. As a result, even if a slight displacement is caused when winding together the positive and negative electrode plates, such desirable state is achieved that each of the negative electrode current collector tabs 2d are opposed to each of the corresponding positive current collector tabs within the non-applied area 1c when the electrode plates being wounded. Therefore, according to the construction described above, the deposition of metal lithium can be prevented more effectively.

A lithium secondary cell having the above-described construction is produced according to the following manner. The values for L1 to L4 are, for example, made to be L1=20 mm, L2=20 mm, L3=40 cm, and L4=30 mm.

Firstly, as shown in FIG. 4, a positive electrode mixture is applied onto both surfaces of a sheet type positive electrode current collector 1a (thickness: 18 μm) composed of aluminum at regular intervals, to form positive electrode active material applied areas 1b on both surfaces of the positive electrode current collector 1a; the positive electrode mixture is prepared by blending a positive electrode active material comprising $LiCoO_2$, a conductivity enhancer composed of carbon, and a binder composed of polyvinylidene fluoride (PVdF). Thus, a positive electrode plate 1 is prepared. Note that, in this step, active material non-applied areas 1c (width L4=30 mm), in which the positive electrode active material is absent, are also formed at regular intervals in a longitudinal direction of the positive electrode current collector 1a.

At the same time, as shown in FIG. 5, a negative electrode mixture is applied on both surfaces of a sheet type negative electrode current collector 2a (thickness: 15 μm) composed of copper to form negative electrode active material applied areas 2b on both surfaces of the negative electrode current collector 2a; the negative electrode mixture is prepared by blending a negative electrode active material composed of natural graphite and a binder composed of PVdF. Thus, a negative electrode plate 2 is formed.

Secondly, a positive electrode current collector tab 1d (width L1=20 mm) consisting of aluminum is welded by ultrasonic welding or laser welding onto each of active material non-applied areas 1c formed on a surface of the positive electrode plate 1, the surface to be opposed to the negative electrode plate 2. In this step, the positive electrode current collector tabs 1d are so disposed that an interval L3 between the current collector tabs 1d is rendered 40 cm.

Figure 6:
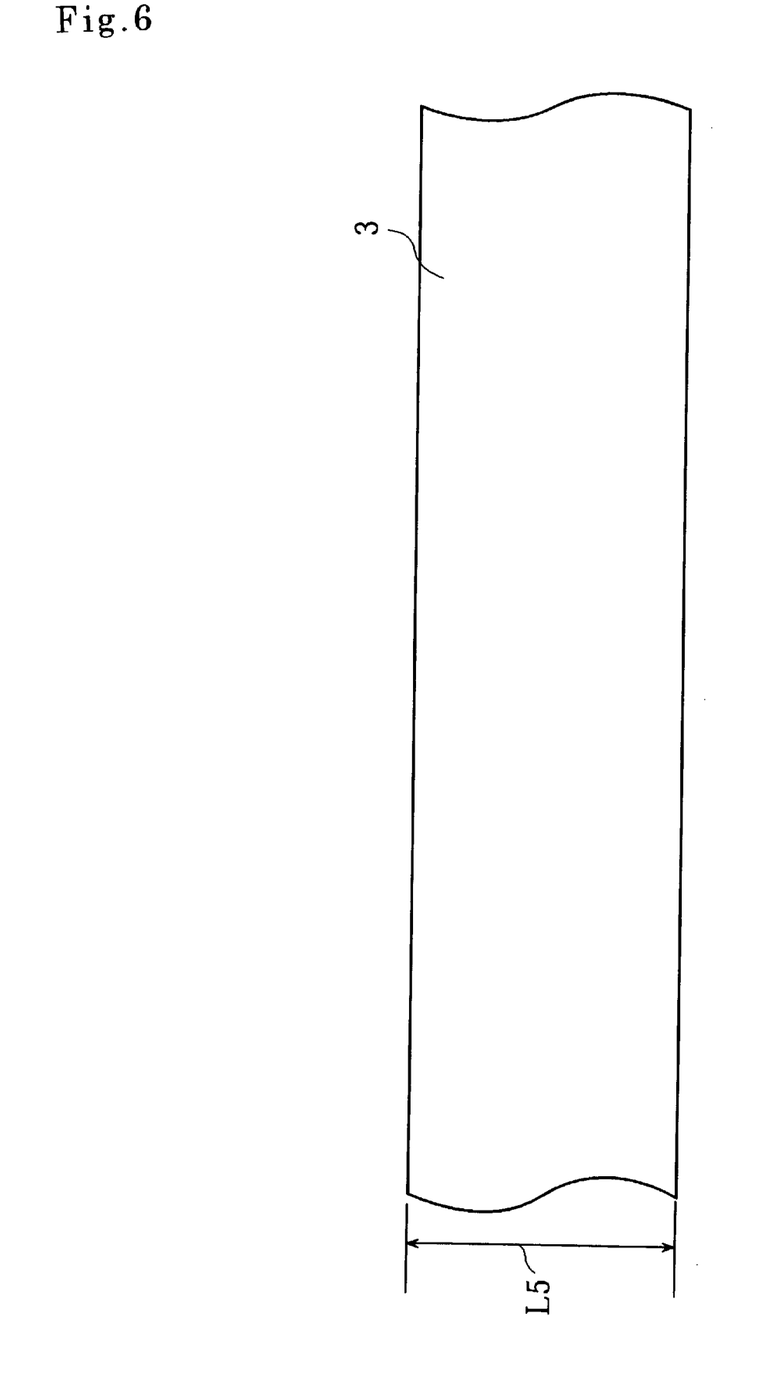
FIG. 6 is a front view showing the separator.

Subsequently, as shown in FIG. 6, a separator 3 is prepared whose width L5 is made to be slightly larger than a width L6 of the positive electrode plate 1 and a width L7 of the negative electrode plate 2. The separator 3 is composed of porous polyethylene or porous polypropylene.

Thereafter, the positive electrode plate 1, the negative electrode plate 2, and the separator 3 are stacked and spirally wound together.

In this step of winding, by ultrasonic welding or laser welding, the negative electrode current collector tabs 2d (width L2=20 mm), which are composed of copper, are welded to the negative electrode active material applied areas 2b formed on the surface opposed to the positive electrode plate 1 in the negative electrode plate 2 so that the negative electrode current collector tabs 2d are opposed to the positive electrode current collector tabs 1d, and at the same time, the positive electrode plate 1 and the negative electrode plate 2 are wound together. By thus welding the negative electrode current collector tabs 2d in the step of winding, the positive electrode current collector tabs 1d and the negative electrode current collector tabs 2d are accurately disposed so as to face each other in a state of the positive and negative electrode plates being wound together. If the welding of the negative electrode current collector tabs 2d and the negative electrode plate 2 is carried out prior to winding the positive and negative electrode plates, a certain degree of displacement which corresponds to curvatures of the positive and negative electrode plates occurs when the positive and negative electrode plates are wound, however accurately the positive electrode current collector tabs $1d$ and the negative electrode current collector tabs $2d$ are disposed before the electrode plates are wound. However, by welding the negative electrode current collector tabs $2b$ when winding the electrode plates, such displacement can be compensated in the negative electrode plate 2. It is noted that securing the negative electrode current collector tabs prior to winding the electrode plates is possible, provided that the curvatures of the positive and negative electrode plates are taken into account to be compensated.

In addition, in the step of winding, the width L4 of the positive electrode active material non-applied area $1c$ is set to be 30 mm, and the width L2 of the negative electrode current collector tab $2d$ is set to be 20 mm. In other words, a ratio W of the width L4 of the positive electrode active material non-applied area $1c$ to the width L2 of the negative electrode tab $2d$, is made to be 1.5. Since the width L4 of the non applied area $1c$ is thus made to be 1.5 times wider than the width L2 of the negative electrode current collector tab $2d$, welding of the negative electrode current collector tabs $2d$ can be carried out with plenty of margin. As previously mentioned, each of the positive electrode active material applied areas $1b$ must be faced with a negative electrode active material applied area $2b$. If a positive electrode active material applied area partly overlaps with a negative electrode current collector tab when winding the electrode plates, deposition of metal lithium is induced since a negative electrode active material is absent in the overlapped portion. However, by making the width L4 of the non-applied area $1c$ larger than the width L2 of the negative electrode current collector tab $2d$, each of the negative electrode current collector tabs $2d$ is disposed within a non-applied area $1c$, even when the winding of the electrode plates is performed without making highly accurate the positions of the negative electrode current collector tabs $2d$ and thereby the positions of the positive electrode current collector tabs $1d$ and the negative electrode current collector tabs $2d$ become slightly off. Accordingly, it is made possible to avoid such a problem that the positive electrode active material applied area $1b$ is disposed in a position opposed to an area in which the negative electrode active material is absent.

Thus, a spirally wound electrode assembly 4 is formed by winding the positive and negative electrode plates according to the above-described manner. Thereafter, the positive electrode tabs $1d$ and the negative electrode tabs $2d$ are respectively welded to each of external terminals provided on a cell lid and a cell can made of metal. Subsequently, a nonaqueous electrolyte, in which $LiPF_6$ is dissolved at a ratio of 1 M (mol/liter) in a mixed solvent consisting of ethylene carbonate and diethyl carbonate (the mixed ratio is 1:1 by volume ratio), is filled into the cell can, and thereafter the cell can is sealed by the cell lid. A cylindrical lithium secondary cell (height: 400 mm, diameter: 60 mm, cell voltage 3.6 V, cell capacity: 70 Ah) is thus prepared.

EXPERIMENT 1

An experiment was performed using the cells according to the above-described embodiment each having a different ratio W of the width of a positive electrode active material non-applied area to the width of a negative electrode tab, in order to study a relationship between the ratio W and a charge-discharge cycle. The results are shown in FIG. 7.

As for the conditions of a charge-discharge cycle, the discharge was performed at 50 Ah, which was 70% of the rated capacity. The charge-discharge current was 0.4 C. In the case where a charge did not reach 50 Ah, or in the case where a charge-discharge efficiency becomes less than 99%, it was defined that a cycle life was expired.

Figure 7:
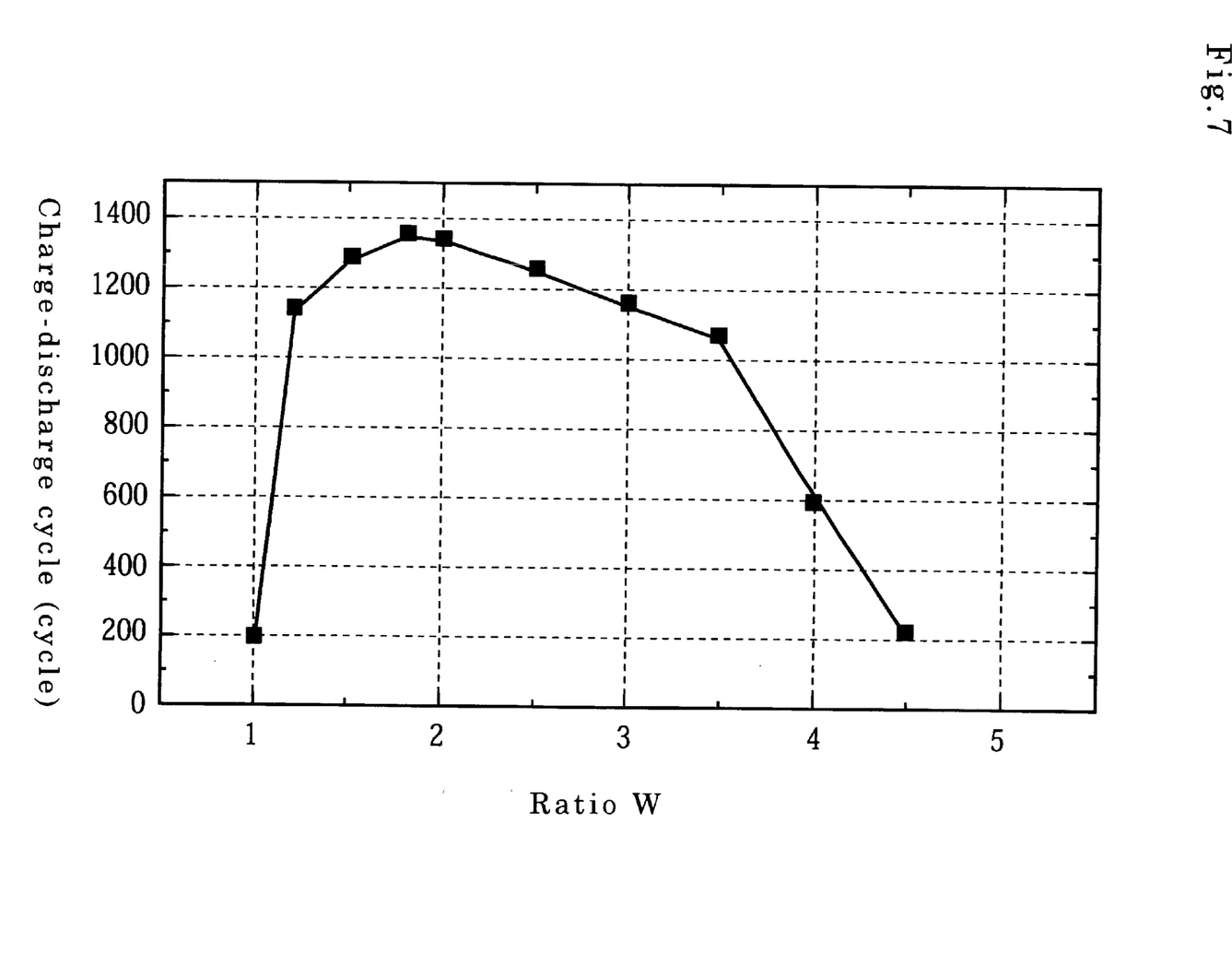
FIG. 7 is a graph showing a relationship between a charge-discharge cycle and a ratio W.

As seen from FIG. 7, in the case of a ratio W being less than 1.2, the cycle life is short, 300 cycles or less, and in the case of the ratio W being more than 3.5, the cycle life is also sharply declined. By contrast, in the case of the ratio being within the range of 1.2 to 3.5, a cycle life of 1000 cycles or more was achieved, which is a satisfactory cycle life for a large-sided cell.

The above test results are attributed to the following. In the case of the ratio W being less than 1.2, the reaction becomes uneven in regions of the electrodes adjacent to the tabs, and therefore, degradation of the cell easily starts from these regions. In the case of the ratio W being more than 3.5, an absolute quantity of a positive electrode active material is insufficient, and thereby depth of charge and discharge becomes too deep, leading to degradation of a cell capacity.

Accordingly, it is preferable that a ratio W of the width of a positive electrode active material non-applied area to the width of a negative electrode tab be within the range of 1.2 to 3.5.

EXPERIMENT 2

In order to study a relationship between a tab interval L3 and a maximum power density, an experiment was performed using cylindrical lithium secondary cells according to the above-described embodiment, each of the cell in which the tab interval L3 is varied. The results are shown in FIG. 8.

Figure 8:
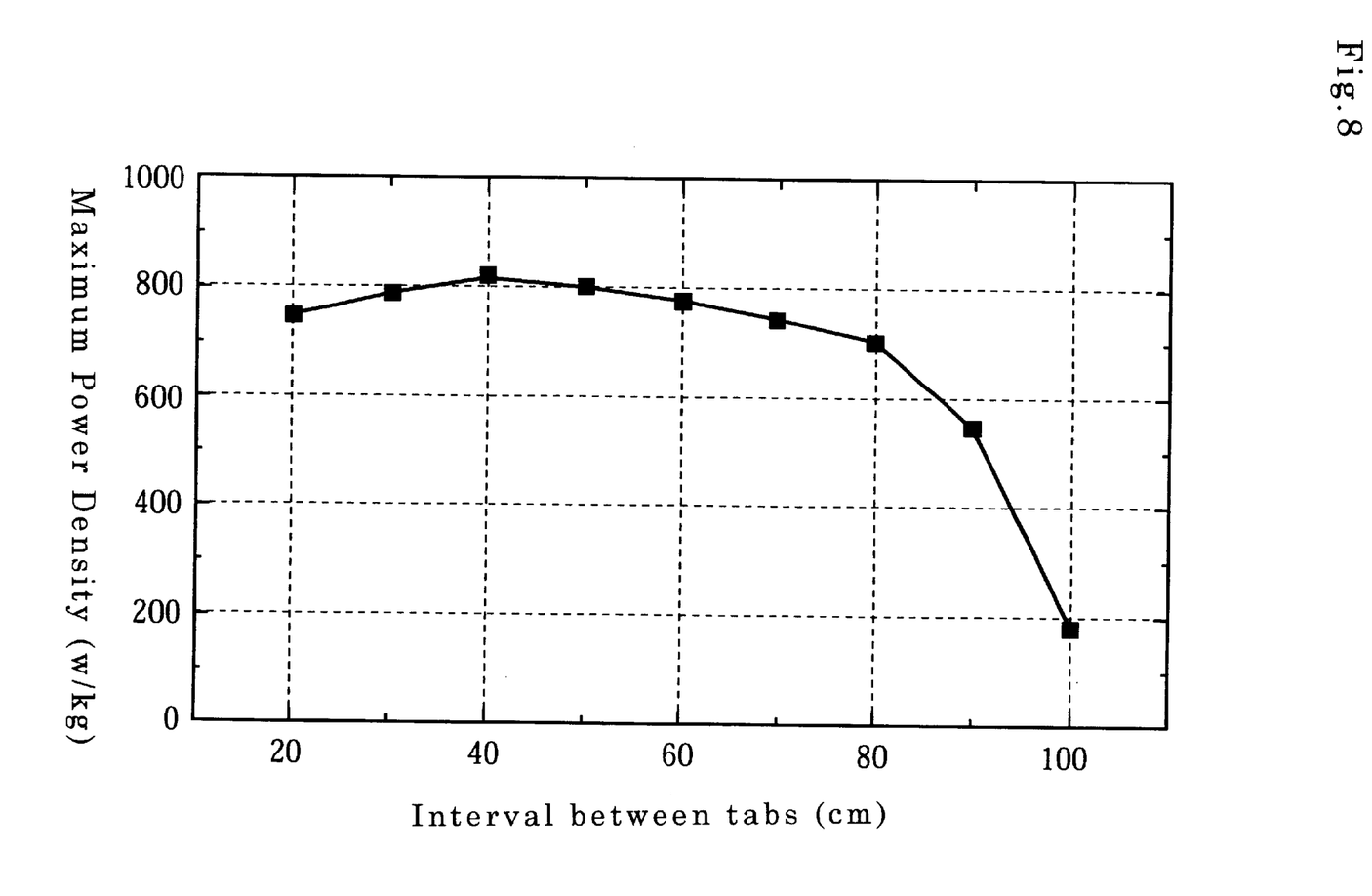
FIG. 8 is a graph showing a relationship of an interval between tabs and a maximum power density.

As seen from FIG. 8, in the case of the tab interval L3 being 80 cm or smaller, the resulting maximum power density was 700 W/kg or higher, whereas in the case of the tab interval L3 being larger than 80 cm, the maximum power density resulted in smaller than 700 W/kg.

It is considered that the result is attributed to the following reasons. In the case of the tab interval being 80 cm or smaller, a potential variation does not occur easily in the electrodes, and therefore a desirable output power can be achieved. On the other hand, in the case of the tab interval L3 being larger than 80 cm, an inner resistance of the cell is rendered large since a potential variation in the current collectors becomes large, and as a result, the output power is degraded.

In the case of the tab interval L3 being smaller than 20 cm, such a construction is not suitable for a practical use since connecting the tabs with the external terminals was difficult.

Further, experiments by the present inventors confirmed that approximately the same relationship between the tab interval L3 and the power density as described above can be obtained in the cells with 10 Wh to 500 Wh. If a cell is one with less than 10 Wh, a current value is so small that there is no need to provide more than three tabs. If a cell is one with more than 500 Wh, there arises a need to make the width of tabs larger (at least larger than 5 cm), and as a result, winding of the electrodes is rendered difficult in production of the cell.

SUPPLEMENTARY NOTES (1) The positive electrode active material usable for the present invention is not limited to the aforementioned $LiCoO_2$, but for example $LiNiO_2$, $LiMnO_2$, $LiFeO_2$ and the like may be also employed.

(2) The negative electrode active material for the present invention is not limited to the aforementioned natural graphite, but other materials such as alloys capable of absorbing and desorbing lithium ions, coke, synthetic graphite, metal lithium, and the like materials are also usable.

(3) An example of a non-aqueous electrolyte usable for the present invention, other than the one shown in a preferred embodiment hereinbefore, is a solution in which $LiClO_4$, $LiCF_3SO_3$, and the like solute is dissolved at a ratio of 0.7 to 1.5 M(mol/liter) in an organic solvent such as vinylene carbonate, propylene carbonate, and the like or in a mixed solvent of such organic solvents as above and a solvent with a low boiling point such as dimethyl carbonate, 1,2-dimethoxyethane, 1,2-diethoxyethane, ethoxymethoxyethan, and the like.

INDUSTRIAL APPLICABILITY

According to the present invention, positive electrode current collector tabs and negative electrode current collector tabs are disposed so that both tabs are opposed to each other, and thereby the negative electrode active material is made to be present at a position opposed to the positive electrode active material. As a result, deposition of metal lithium can be prevented, and an improved charge-discharge characteristic can be attained.

Furthermore, since the positive electrode current collector tabs and the negative electrode current collector tabs are disposed so that they are opposed in a longitudinal direction of the positive and negative electrode plates, uneven potential distribution caused in the longitudinal direction of the positive and negative electrode plates can be suppressed, and thereby a high power cell can be achieved.

In addition, the current collector tabs are provided in plurality in the longitudinal direction of the positive and negative electrode plates, and efficiency of current collection is thereby increased. As a result, an internal resistance of a cell is reduced and a cell performance can be improved.

Accordingly, the present invention is remarkably useful in the industry.

What is claimed is:

1. A lithium secondary cell comprising a spirally-wound electrode assembly in which a positive electrode plate and a negative electrode plate are spirally wound with a sheet of separator interposed therebetween, said positive electrode plate comprising a sheet of positive electrode current collector and a positive electrode active material formed on both surfaces of said positive electrode current collector, said negative electrode plate comprising a sheet of negative electrode current collector and a negative electrode active material formed on both surfaces of said negative electrode current collector, wherein:

a plurality of positive electrode current collector tabs are attached to the positive electrode plate so that an interval is formed between the plurality of the positive electrode current collector tabs in a longitudinal direction of the positive electrode plate;

a plurality of negative electrode current collector tabs are attached to the negative electrode plate so that an interval is formed between the plurality of the negative electrode current collector tabs in a longitudinal direction of the negative electrode plate; and in a state of the positive electrode plate and negative electrode plate being wound together, the plurality of the positive electrode current collector tabs and the plurality of the negative electrode current collector tabs are so disposed as to face each other with the separator interposed therebetween.

2. A lithium secondary cell according to claim 1, wherein:

in the positive electrode plate, an applied area in which a positive electrode active material is applied and a non-applied area in which said positive electrode active material is not applied are formed alternately in the longitudinal direction of the positive electrode plate;

each of the positive electrode current collector tabs is attached to the positive electrode current collector within the non-applied area thereof; and a ratio W ($L4/L2$) of a width $L4$ of the non-applied area to a width $L2$ of the negative electrode current collector tab is between 1.2 and 3.5.

3. A lithium secondary cell according to claim 1, wherein the interval between the plurality of the positive electrode current collector tabs and the interval between the plurality of the negative electrode current collector tabs are both within the range of 20 cm to 80 cm.

4. A lithium secondary cell according to claim 2, wherein the interval between the plurality of the positive electrode current collector tabs and the interval between the plurality of the negative electrode current collector tabs are both within the range of 20 cm to 80 cm.

5. A lithium secondary cell according to claim 1, wherein a width of the positive electrode current collector tab and a width of the negative electrode current collector tab are both within the range of 10 mm to 30 mm.

6. A lithium secondary cell according to claim 2, wherein a width of the positive electrode current collector tab and a width of the negative electrode current collector tab are both within the range of 10 mm to 30 mm.

7. A lithium secondary cell according to claim 3, wherein a width of the positive electrode current collector tab and a width of the negative electrode current collector tab are both within the range of 10 mm to 30 mm.

8. A lithium secondary cell according to claim 4, wherein a width of the positive electrode current collector tab and a width of the negative electrode current collector tab are both within the range of 10 mm to 30 mm.

9. A method of manufacturing a lithium secondary cell comprising the steps of:

producing a positive electrode plate by forming a positive electrode active material layer on both surfaces of a sheet of positive electrode current collector, and thereafter attaching a plurality of positive electrode current collector tabs so that an interval is formed between the plurality of positive electrode current collector tabs in a longitudinal direction of the positive electrode plate;

producing a negative electrode plate by forming a negative electrode active material layer on both surfaces of a sheet of negative electrode current collector;

attaching a plurality of negative electrode current collector tabs on the negative electrode plate so that each of the plurality of negative electrode current collector tabs is opposed to each of the plurality of positive current collector tabs, with interposing a sheet of separator between the positive electrode plate and the negative electrode plate; and simultaneously with said step of attaching the plurality of negative electrode current collector tabs, spirally winding the positive electrode plate, the negative electrode plate, and the separator.

* * * * *